(12) United States Patent
Malkos et al.

(10) Patent No.: US 8,094,067 B2
(45) Date of Patent: Jan. 10, 2012

(54) METHOD AND SYSTEM FOR DETERMINING A POSITION OF A MOBILE COMMUNICATION DEVICE

(75) Inventors: Steven Malkos, San Jose, CA (US); Andrei Kosolobov, San Jose, CA (US); David Albert Lundgren, Mill Valley, CA (US); Manuel del Castillo, Madrid (ES); Christopher Lane, Ridgewood, NJ (US); Alexander Michael Usach, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 412 days.

(21) Appl. No.: 12/394,416

(22) Filed: Feb. 27, 2009

(65) Prior Publication Data

US 2010/0039315 A1    Feb. 18, 2010

Related U.S. Application Data

(63) Continuation-in-part of application No. 12/190,192, filed on Aug. 12, 2008.

(51) Int. Cl.
*G01S 19/05* (2010.01)
*G01S 19/06* (2010.01)
(52) U.S. Cl. .............................. 342/357.42; 342/357.43
(58) Field of Classification Search ............. 342/357.42, 342/357.43
See application file for complete search history.

(56) References Cited

U.S. PATENT DOCUMENTS

| | | | | |
|---|---|---|---|---|
| 7,123,928 | B2 * | 10/2006 | Moeglein et al. | 455/456.3 |
| 7,755,544 | B2 * | 7/2010 | Kawakami et al. | 342/357.42 |
| 7,898,473 | B2 * | 3/2011 | Sairo et al. | 342/357.43 |
| 2002/0080063 | A1 * | 6/2002 | Bloebaum et al. | 342/357.1 |
| 2003/0125044 | A1 * | 7/2003 | Deloach et al. | 455/456 |
| 2004/0203915 | A1 * | 10/2004 | van Diggelen et al. | 455/456.1 |

* cited by examiner

*Primary Examiner* — Gregory C Issing

(74) *Attorney, Agent, or Firm* — McAndrews, Held & Malloy, Ltd.

(57) ABSTRACT

A GNSS enabled mobile device transmits to a location server a combination of GNSS-based location data and non-GNSS based location data used to determining reference positions at the location server. The GNSS mobile device receives the determined reference positions from the location server to calculate an associated GNSS position fix. The transmitted GNSS-based location data comprises GNSS position fixes associated with the GNSS enabled mobile device. The transmitted non-GNSS-based location data comprises a serving Cell-ID, neighbor Cell-IDs, neighbor cell fingerprinting, timing advance parameters, and/or a mobile country code. Reference positions associated with the serving Cell-ID are determined and/or refined based on location information acquired from each of associated mobile devices. To respond to a reference position request from the GNSS enabled mobile device without an associated serving Cell-ID, the location server determines corresponding reference positions by combing subscriber population density with an associated MCC.

22 Claims, 8 Drawing Sheets

US 8,094,067 B2

METHOD AND SYSTEM FOR DETERMINING A POSITION OF A MOBILE COMMUNICATION DEVICE

CROSS-REFERENCE TO RELATED APPLICATIONS/INCORPORATION BY REFERENCE

This patent application is a continuation-in-part of U.S. patent application Ser. No. 12/190,192 filed on Aug. 12, 2008.

The above stated application is hereby incorporated by reference in its entirety.

FIELD OF THE INVENTION

Certain embodiments of the invention relate to signal processing for communication systems. More specifically, certain embodiments of the invention relate to a method and system for determining a position of a mobile communication device.

BACKGROUND OF THE INVENTION

Location based services (LBS) are emerging as a new type of value-added service provided by mobile communication network. LBS are mobile services in which the user location information is used in order to enable various LBS applications such as, for example, enhanced 911 (E-911) services. A position of a mobile device is determined in different ways such as, for example, using network-based technology, using terminal-based technology, and/or hybrid technology (a combination of the former technologies). Many positioning technologies such as, for example, Cell of Origin (COO), Time of Arrival (TOA), Observed Time Difference of Arrival (OT-DOA), Enhanced Observed Time Difference (E-OTD) as well as the satellite-based systems such as the global positioning system (GPS), or Assisted-GPS (A-GPS), are in place to estimate the location of the mobile device and convert it into a meaningful X, Y coordinate for LBS applications.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for determining a position of a mobile communication device, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for determining a position of a mobile communication device. In accordance with various exemplary embodiments of the invention, a GNSS enabled mobile device may be enabled to generate GNSS-based location data and non-GNSS based location data and transmit a combination of the generated GNSS-based location data and non-GNSS based location data to a location server for more accurate reference positions. The location server may be enabled to determine reference positions based on the transmitted combination of the generated GNSS-based location data and non-GNSS based location data. The determined reference positions may be communicated to the GNSS enabled mobile device via a wireless communication network. The GNSS enabled mobile device may be enabled to receive the determined reference positions from the location server to calculate an associated GNSS position fix.

The generated GNSS-based location data may comprise GNSS position fixes associated with the GNSS enabled cell phone 110c. The generated non-GNSS based location data may comprise a serving Cell-ID, one or more neighbor Cell-IDs, neighbor cell fingerprinting, timing advance parameters, and/or a mobile country code. The neighbor cell fingerprint may comprise signal strength, signal time delay, and/or a channel impulse response measured for signals from the corresponding one or more neighbor cells at the GNSS enabled mobile device. The location server may be enabled to acquire and/or learn location information associated with the serving Cell-ID from the GNSS enabled mobile device as well as other served mobile devices associated with the location server. The location server may be enabled to determine and/or refine reference positions based on the acquired location information. The location server may be enabled to determine and/or refine reference positions in various ways such as, for example, by correlating the serving Cell-ID with GNSS position fixes, timing advance parameters, and/or neighbor cell fingerprinting. The location server may be enabled to adaptively compute an uncertainty level with a fixed confidence of the determined and/or refined reference positions. The uncertainty level may be determined based on the acquired location information such as GNSS position fixes and/or timing advance parameters associated with the serving Cell-ID. To respond to a reference position request from the GNSS enable mobile device without an associated serving Cell-ID, the location server may be configured to identify subscriber population density of an associated mobile country code (MCC) via the wireless communication network. The combination of the identified subscriber population density and the associated MCC may be utilized to determine corresponding reference positions associated with the GNSS enabled mobile device.

Figure 1:
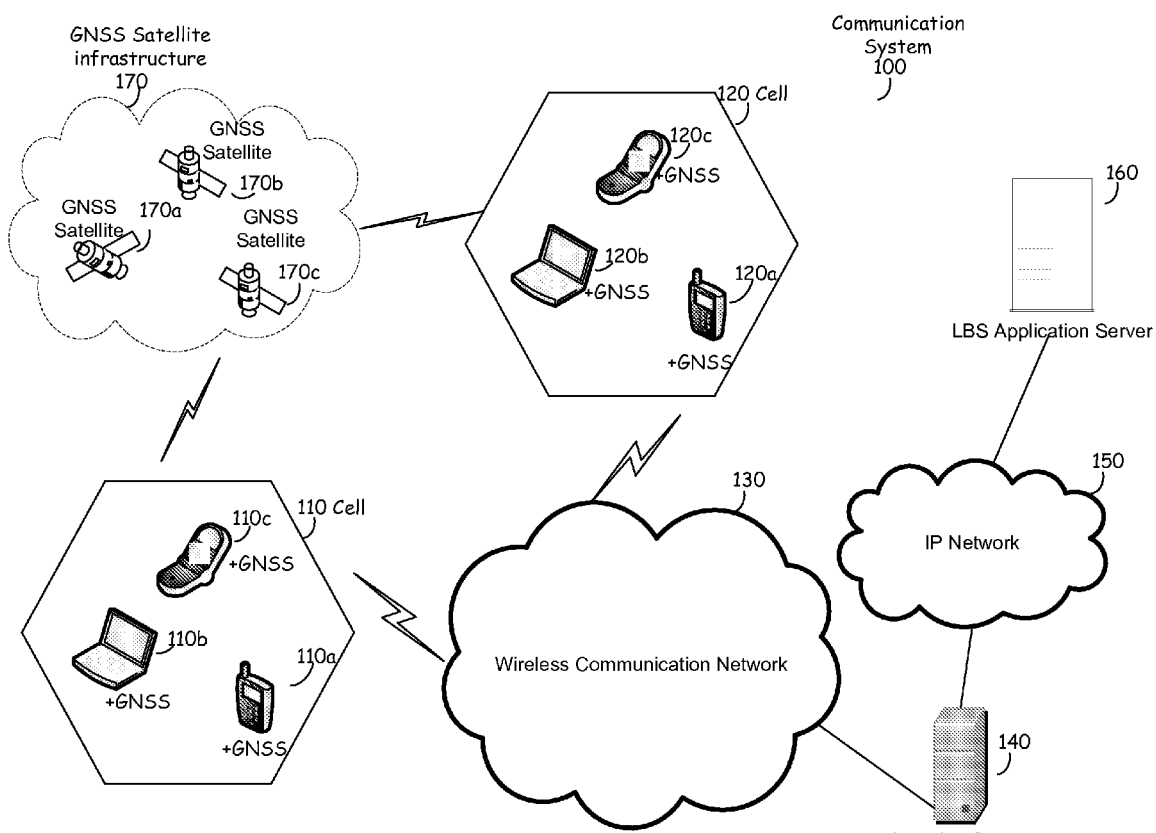
FIG. 1 is a diagram illustrating an exemplary communication system that enables determining a position of a mobile communication device, in accordance with an embodiment of the invention.

FIG. 1 is a diagram illustrating an exemplary communication system that enables determining a position of a mobile communication device, in accordance with an embodiment of the invention. Referring to FIG. 1, there is shown a communication system 100 comprising a plurality of cells, of which a cell 110 and a cell 120 are displayed, a wireless communication network 130, a location server 140, an IP network 150, a LBS application server 160, and a GNSS satellite infrastructure 170, of which GNSS satellites 170a-170c are displayed. A plurality of mobile devices, of which a GNSS enabled smart phone 110a, a GNSS enabled notebook computer 110b, and a GNSS enabled cell phone 110c are displayed, may be located within the cell 110. The cell 120 comprises a plurality of mobile devices, of which a GNSS enabled smart phone 120a, a GNSS enabled notebook computer 120b, and a GNSS enabled cell phone 120c are displayed.

The cell 110 and/or the cell 120 comprise geographical areas covered by associated base stations. A cell such as the cell 110 may be identified by a unique cell identifier, which is referred to as the Cell-ID. A plurality of served mobile devices such as, for example, the GNSS enabled smart phone 110a, the GNSS enabled notebook computer 110b, and the GNSS enabled cell phone 110c, may be located in the cell 110.

A served mobile device such as the GNSS enabled cell phone 110c may comprise suitable logic, circuitry and/or code that may be enabled to communicate with the wireless communication network 130 as well as the GNSS satellite infrastructure 170. The GNSS enabled cell phone 110c may be capable of transmitting and/or receiving radio signals across the wireless communication network 130 compatible with various telecommunication standards such as, for example, 3GPP, 3GPP2, WiFi, and WiMAX. The GNSS enabled cell phone 110c may be enabled to receive GNSS signals from a plurality of GNSS satellites such as the GNSS satellites 170a through 170c to determine a position fix associated with the GNSS enabled cell phone 110c. A quick position fix for the GNSS enabled cell phone 110c may be determined based on reference position information acquired from the location server 140.

The reference position information may be acquired in various ways such as cell-ID based and/or MCC code based. In this regard, to improve the accuracy of reference positions acquired from the location server 140, the GNSS enabled cell phone 110c may be enabled to generate location data, which may be communicated to the location server 140. The uncertainty level with a fixed confidence level of the acquired reference positions may be adaptive to various location information captured, determined and/or learned from a plurality of mobile devices associated with the location server 140. The location information may be generated by associating a serving Cell-ID with latitude and longitude (Lat, Lon) of the determined GNSS position fix, timing advance (TA) parameters, and/or neighbor cell information. The neighbor cells may be the cells within a vicinity of the GNSS enabled cell phone 110c. In instances where a particular Cell-ID may not be indicated in a reference position request, the GNSS enabled cell phone 10c may be enabled to generate location data comprising an associated mobile country code (MCC) and provide to the location server 140.

The wireless communication network 130 may comprise suitable logic, circuitry and/or code that may be enabled to support various voice and/or data services to various served mobile devices such as the GNSS enabled cell phone 110c in the cell 110 and the smart phone 120a in the cell 2, respectively. The wireless communication network 130 may be operable to support various telecommunication standards such as, for example, CDMA 2000, WCDMA, GSM, UMTS, LTE, WiFi, and/or WiMAX communication standards. The wireless communication network 130 may be enabled to communicate various LBS applications from the LBS application server 160 to a plurality of served mobile devices such as the GNSS enabled cell phone 110c via the Internet 140 and the wireless communication network 130, respectively.

The location server 140 may comprise suitable logic, devices and/or code that may enable retrieval of location information for residential as well as enterprise users. The location server 140 may be enabled to convert retrieved location information into a meaningful X, Y coordinate for various LBS applications provided by the LBS application server 160. The location server 140 may be enabled to determine various reference positions associated with served mobile devices such as the GNSS enabled cell phone 110c based on location data such as, for example, a serving Cell-ID and/or an associated MCC. The location data may be provided either directly by the wireless communication network 130 or by the GNSS enabled cell phone 110c via various signaling such as, for example, a short message service (SMS). In various embodiments of the invention, in-band and/or out-of-band may be utilized to provide the location information. The location server 140 may be enabled to acquire, capture or learn location information from the GNSS enabled cell phone 110c as well as other associated mobile devices. The acquired location information may comprise GNSS-based location data such as GNSS position fixes, and/or non-GNSS based location data such as serving Cell-ID, neighbor Cell-IDs, TA parameters, and/or associated MCC.

The location server 140 may utilize the captured, determined and/or learned location information to determine and/or refine reference positions associated with a particular serving Cell-ID and/or a particular MCC. For example, the location server 140 may correlate a particular serving Cell-ID with associated GNSS position fixes, neighbor Cell-IDs, and/or associated TA parameters to determine reference positions associated with the particular serving Cell-ID. Moreover, the location server 140 may be configured to determine reference positions associated with a particular MCC and assign to served mobile devices when the corresponding serving Cell-ID may not be available. The determined reference positions, whether a Cell-ID based or a MCC-based, may be communicated to the served mobile devices via the wireless communication network 130. In the event that the particular serving Cell-ID that a served mobile device is attached may be known to the location server 140, an adaptive uncertainty level with a fixed confidence level may be computed and assigned to the determined and/or refined reference positions associated with the particular serving Cell-ID. The adaptive uncertainty level with the fixed confidence level may be determined based on captured, derived and/or learned location information from each of associated mobile devices. In the event that the particular serving Cell-ID that the served mobile device is attached may not be known, the location server 140 may be enabled to determine reference positions of an associated MCC by combining with corresponding subscriber population density centroid of the associated MCC.

The IP network 150 may comprise suitable logic, devices and/or code that enables data communication via various network wired and/or wireless technologies using internet protocols (IP). The IP network 150 may be operable to provide communication between the LBS application server 160 and a plurality of served mobile devices such as the GNSS enabled cell phone 110c.

The LBS application server 160 may comprise suitable logic, circuitry and/or code that is enabled to retrieve various positioning information such as, for example, a requested hotel addresses and a map of the vicinity of areas of interest. The LBS application server 160 may be enabled to communicate the retrieved positioning information with various mobile devices such as the GNSS enabled cell phone 110c based on corresponding position fix.

The GNSS satellite infrastructure 170 may comprise suitable logic, circuitry and/or code that provide navigation information to various GNSS receivers. The GNSS receivers, which comprise GPS, GALILEO and/or GLONASS receivers, are integrated within or externally coupled to the mobile devices such as the GNSS enabled cell phone 110c.

In operation, various mobile devices such as, for example, the GNSS enabled cell phone 110c may be attached to a cell such as the cell 110 to communicate with the wireless communication network 130. The GNSS enabled cell phone 110c may be enabled to acquire GNSS signals from the GNSS satellite infrastructure 170. The acquired GNSS signals may be used to calculate a GNSS position fix associated with the GNSS enabled cell phone 110c. To achieve a fast position fix, the GNSS enabled cell phone 110c may be enabled to acquire associated reference positions from the location server 140 by providing location information such as a serving Cell-ID and/or an associated MCC. In this regard, the GNSS enabled cell phone 110c may be enabled to generate location data and communicate with the location server 140 for more accurate reference positions. The generated location data may be GNSS-based location data and/or non-GNSS based location data. The generated GNSS-based location data may comprise GNSS position fixes. The generated non-GNSS-based location data may comprise serving Cell-ID, neighbor Cell-IDs, GNSS position fixes, TA parameters, and/or associated MCC. For a particular Cell-ID of a cell in which the GNSS enabled cell phone 110c is located, the location server 140 may be enabled to adaptively calculate an uncertainty level with a fixed confidence level based on location information contributed from each of associated mobile devices to the location server 140. The location server 140 may determine and/or refine reference positions with the calculated uncertainty level and the fixed confidence level. In instances where a particular Cell-ID of a cell in which the GNSS enabled cell phone 110c is located is unknown, the location server 140 may be enabled to determine reference positions of an associated MCC based on corresponding subscriber population density centroid of the associated MCC. The determined reference positions may be communicated to the GNSS enabled cell phone 110c via the wireless communication network 130. The GNSS enabled cell phone 110c may utilize the reference position to achieve a fast position fix for various LBS applications supported by the LBS application server 160.

Figure 2:
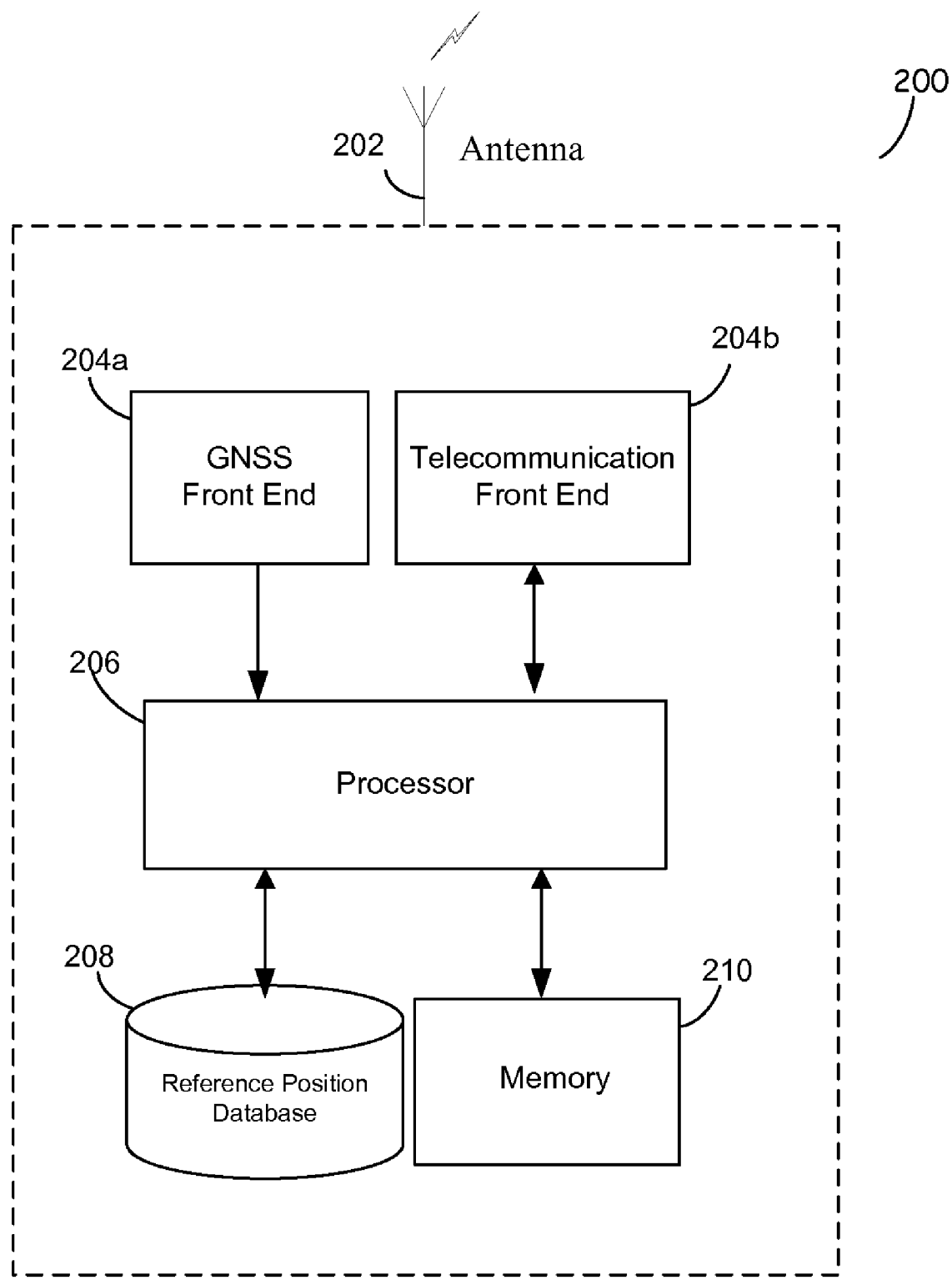
FIG. 2 is a diagram illustrating an exemplary mobile device that is operable to provide location information for mobile positioning, in accordance with an embodiment of the invention.

FIG. 2 is a diagram illustrating an exemplary mobile device that is operable to provide location information for mobile positioning, in accordance with an embodiment of the invention. Referring to FIG. 2, there is shown a GNSS enabled mobile device 200 comprising an antenna 202, a GNSS front end 204a, a telecommunication front end 204b, a processor 206, a reference position database 208, and a memory 210.

The antenna 202 may comprise suitable logic, circuitry and/or code that may be enabled to receive GNSS signals from a plurality of GNSS satellites such as the GNSS satellites 170a through 170c and may be capable of transmitting and/or receiving radio signals via, for example, the wireless communication network 130. The antenna 202 may be a single antenna for communicating GNSS signals from the GNSS satellite 170a through 170c and radio signals from the wireless communication network 130. The antenna 202 may comprise separate antenna communicating GNSS signals from the GNSS satellite 170a through 170c and radio signals from the wireless communication network 130, respectively.

The GNSS front end 204a may comprise suitable logic, circuitry and/or code that may be enabled to receive GNSS satellite broadcast signals via the antenna 202 and convert them to GNSS baseband signals, which may be suitable for further processing in the processor 206 for a navigation solution.

The telecommunication front end 204b may comprise suitable logic, circuitry and/or code that may be enabled to transmit and/or receive radio signals over the wireless communication network 130 via the antenna 202 and convert them to corresponding baseband signals, which may be suitable for further processing in the processor 206.

The processor 206 may comprise suitable logic, circuitry and/or code that may be enabled to process received satellite signals as well as signals received from the wireless communication network 130. The processor 206 may be configured to extract navigational information from each received GNSS signal to compute a position fix associated with the GNSS enabled mobile device 200. The processor 206 may be programmed to calculate the position fix by combining local GNSS measurements and the reference position database 208. The processor 206 may be enabled to acquire reference positions associated with the GNSS enabled mobile device 200 from the location server 140. The processor 206 may be enabled to provide location information such as a serving Cell-ID and/or an associated MCC to the location server 140 at a time requesting reference positions. In this regard, the processor 206 may be enabled to generate location data and communicate with the location server 140 for more accurate reference positions. The generated location data may comprise GNSS-based location data such as associated GNSS position fixes, and/or non-GNSS based location data such as serving Cell-ID, neighbor Cell-IDs, associated timing advance (TA) parameters, and/or an associated MCC. In return, the processor 206 may be enabled to receive refined reference positions associated with the GNSS enabled mobile device 200 from the location server 140.

The reference position database 208 may comprise suitable logic, circuitry, and/or code that may be operable to manage and store data comprising reference positions associated with the GNSS enabled mobile device 200. The contents in the reference position database 208 may be used as reference positions for GNSS calculations of the GNSS enabled mobile device 200. The contents in the reference position database 208 may be updated as a needed base or periodically.

The memory 210 may comprise suitable logic, circuitry, and/or code that may enable storing of information such as executable instructions and data that may be utilized by the processor 206. The executable instructions may comprise algorithms that may be enabled to calculate a position fix using local GNSS measurements and/or reference positions provided by the reference position database 208. The data may comprise local GNSS measurements and location data.

The local GNSS measurements may be associated to the satellite signals directly received from the GNSS satellite 170a through 170c. The location data may comprise neighbor cell fingerprinting comprising measured neighbor signal strength and/or signal time delay. The memory 210 may comprise RAM, ROM, low latency nonvolatile memory such as flash memory and/or other suitable electronic data storage.

In operation, a plurality of signals may be received at the antenna 202 coupled to the GNSS enabled mobile device 200. The received plurality of signals may be measured and communicated to the GNSS front end 204a or the telecommunication front end 204b, respectively, depending on the type of received signals. The GNSS front end 204a may convert the received GNSS signals to corresponding baseband signals and communicate to the processor 206. The telecommunication front end 204b may convert the received telecommunication signals into corresponding baseband signals and communicate to the processor 206. The received telecommunication signals may comprise reference position data from the location server 140. The received reference position data may be stored in reference position database 208. For more accurate reference position data, the processor 206 may be enabled to generate location data and communicate with the location server 140 via the telecommunication front end 204b. The processor 206 may receive reference positions of associated serving Cell-ID or an associated MCC. The received reference positions may be stored in the reference position database 208. The received reference positions of the associated serving Cell-ID may comprise an adaptive uncertainty level and a fixed confidence level. The received reference positions of the associated MCC may be determined based on corresponding subscriber population density centroid of the associated MCC. The processor 206 may be enabled to determine a position fix associated with the GNSS enabled mobile device 200 based on the local GNSS measurements from the GNSS front end 204a and/or received reference positions stored in the reference position database 208. The processor 206 may determine the position fix associated with the GNSS enabled mobile device 200 using various algorithms stored in the memory 210.

Figure 3:
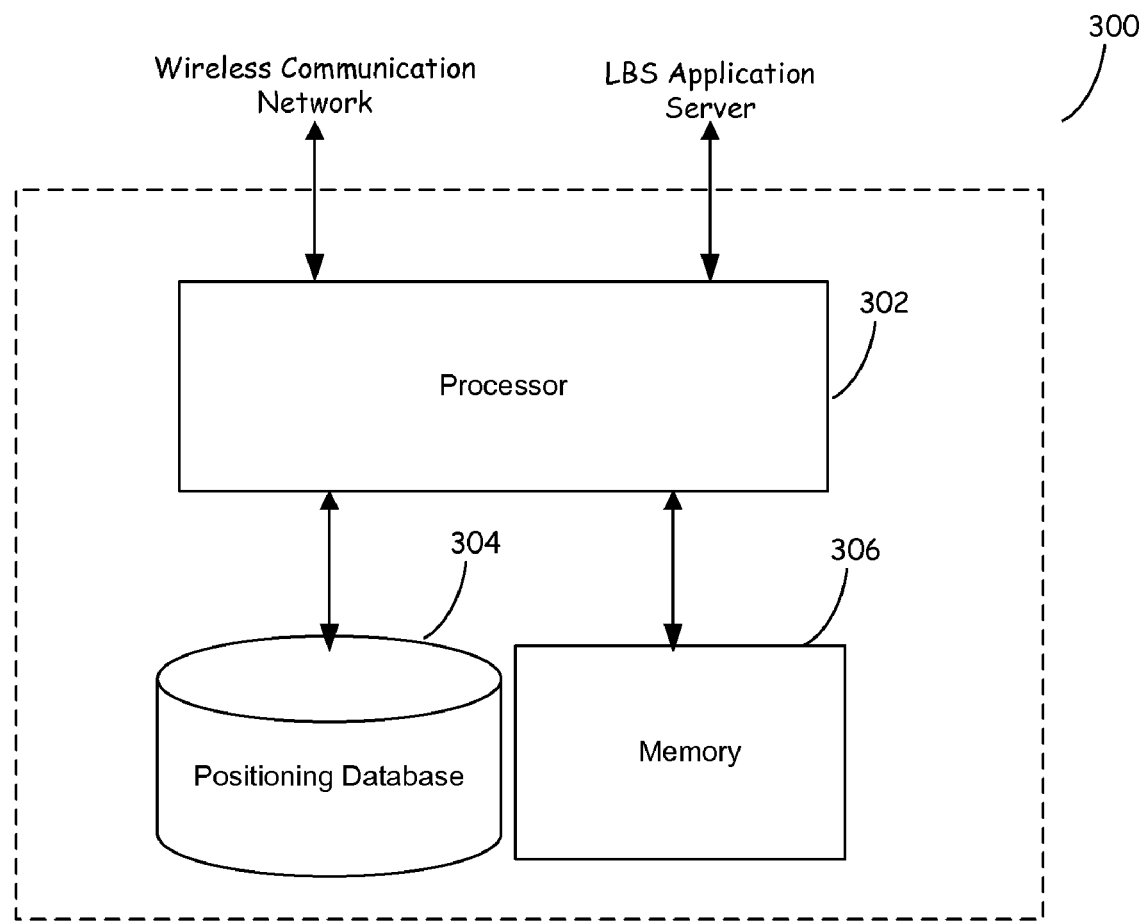
FIG. 3 is a diagram illustrating an exemplary location server that enables mobile positioning using location information from associated mobile devices, in accordance with an embodiment of the invention.

FIG. 3 is a diagram illustrating an exemplary location server that enables mobile positioning using location information from associated mobile devices, in accordance with an embodiment of the invention. Referring to FIG. 3, there is shown a location server 300 comprising an antenna a processor 302, a positioning database 304, and a memory 306.

The processor 302 may comprise suitable logic, circuitry and/or code that may be enabled to process reference position requests from various served mobile devices such as the GNSS enabled mobile device 200. The processor 302 may be operable to capture, determine and/or learn location information such as, for example, Cell-IDs and/or associated MCC, from a plurality of associated mobile devices. In this regard, the processor 302 may be enabled to receive location information comprising serving Cell-ID, neighbor Cell-IDs, neighbor cell fingerprinting, associated GNSS position fixes, associated TA parameters, and/or associated MCC. The processor 302 may be enabled to utilize the captured, determined and/or learned location information to determine and/or refine reference positions of a particular serving Cell-ID and/or a particular MCC. The processor 302 may be enabled to calculate uncertainty level adaptively with a fixed confidence level for the reference positions of the particular serving Cell-ID.

An uncertainty level associated with the reference positions of the particular serving Cell-ID may be determined based on the captured location information from the plurality of mobile devices associated with the location server 140. For example, the uncertainty level associated with the reference positions of the particular serving Cell-ID may be re-computed when the captured location information such as a GNSS position fix and/or timing advance (TA) parameter associated with a mobile device in the corresponding cell changes. In instances where the particular serving Cell-ID may be unknown to the location server 300, the processor 302 may be enabled to acquire subscriber population density centroid of an associated MCC from, for example, the wireless communication network 130. The processor 302 may be enabled to determine reference positions of the associated MCC based on the acquired subscriber population density centroid of the associated MCC.

The positioning database 304 may comprise suitable logic, circuitry, and/or code that may be operable to manage and/or store data comprising reference positions and/or location information that is captured, determined and/or learned from a plurality of mobile devices associated with the location server 300. In this regard, the positioning database 304 may be enabled to provide the captured, determined and/or learned location information to the processor 302 to determine and/or refine reference positions associated with a particular Cell-ID and/or a particular MCC. The contents in the positioning database 304 may be updated as a needed base or periodically.

The memory 306 may comprise suitable logic, circuitry, and/or code that may enable storing of information such as executable instructions that may be utilized by the processor 302. The executable instructions may comprise algorithms that may be enabled to determine and/or refine reference positions associated with a particular cell such as the cell 110 based on the captured location information stored in the positioning database 304. The memory 306 may comprise RAM, ROM, low latency nonvolatile memory such as flash memory and/or other suitable electronic data storage.

In operation, various location information from a plurality of mobile devices associated with the location server 140 may be captured, determined and/or learned via the processor 302. The processor 302 may be enabled to determine and/or refine reference positions associated with a particular Cell-ID and/or a particular MCC based on the captured location information. In instances where reference positions associated with the GNSS enabled mobile device 200 may be requested, the processor 302 may be enabled to communicate with the positioning database 304 to acquire the captured location information from the plurality of mobile devices associated with the location server 300. The processor 302 may be enabled to determine and/or refine corresponding reference positions using various algorithms stored in the memory 306 based on the acquired captured location information. The determined or refined reference positions of the particular Cell-ID or the particular MCC may be communicated with a served mobile device such as the GNSS enabled mobile device 200 for various LBS applications supported by the LBS application server 160.

Figure 4:
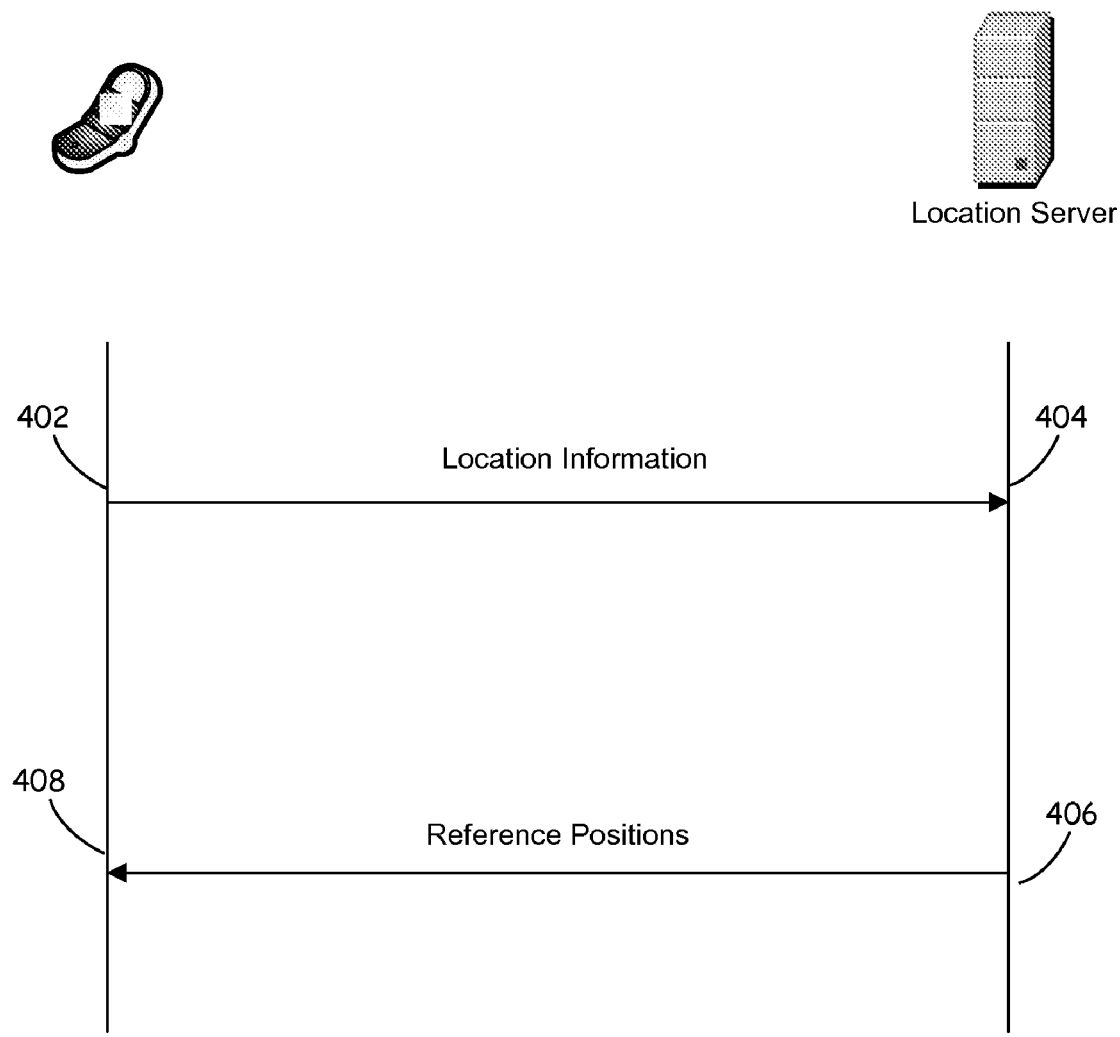
FIG. 4 is an exemplary call flow that illustrates exemplary determining a position of a mobile communication device using location information, in accordance with an embodiment of the invention.

FIG. 4 is an exemplary call flow that illustrates exemplary determining a position of a mobile communication device using location information, in accordance with an embodiment of the invention. Referring to FIG. 4, the exemplary steps start with step 402, where a particular mobile device such as the GNSS enabled cell phone 110c within the cell 110 may request associated reference positions from the location server 140. The GNSS enabled cell phone 110c may be enabled to generate location data and provide to the location server 140. The generated location data may comprise GNSS-based location data comprising associated GNSS position fixes, and/or may be non-GNSS-based location data comprising serving Cell-ID, neighbor Cell-IDs, neighbor cell fingerprinting, associated TA parameters, and/or associated MCC. For example, the GNSS enabled cell phone 110c may provide a particular serving Cell-ID such as the Cell-ID of the cell 110, neighbor Cell-IDs such as the Cell-ID associated with the cell 120, and/or an associated MCC.

In step 404, the location server 140 may be enabled to determine and/or refine reference positions associated with, for example, the particular serving Cell-ID, based on location information captured or learned related to the particular serving Cell-ID from the GNSS enabled cell phone 110c as well as other mobile devices such as the GNSS enabled notebook computer 110b and the GNSS enabled smart phone 120a associated with the location server 140. In step 406, the location server 140 may communicate the determined or refined reference positions to the GNSS enable cell phone 110c via the wireless communication network 130. In step 408, the GNSS enable cell phone 110c may be enabled to determine an associated position fix based on the received refined reference positions, accordingly. The determined associated position fix may be utilized to enable a LBS application provided by the LBS server 160.

Figure 5:
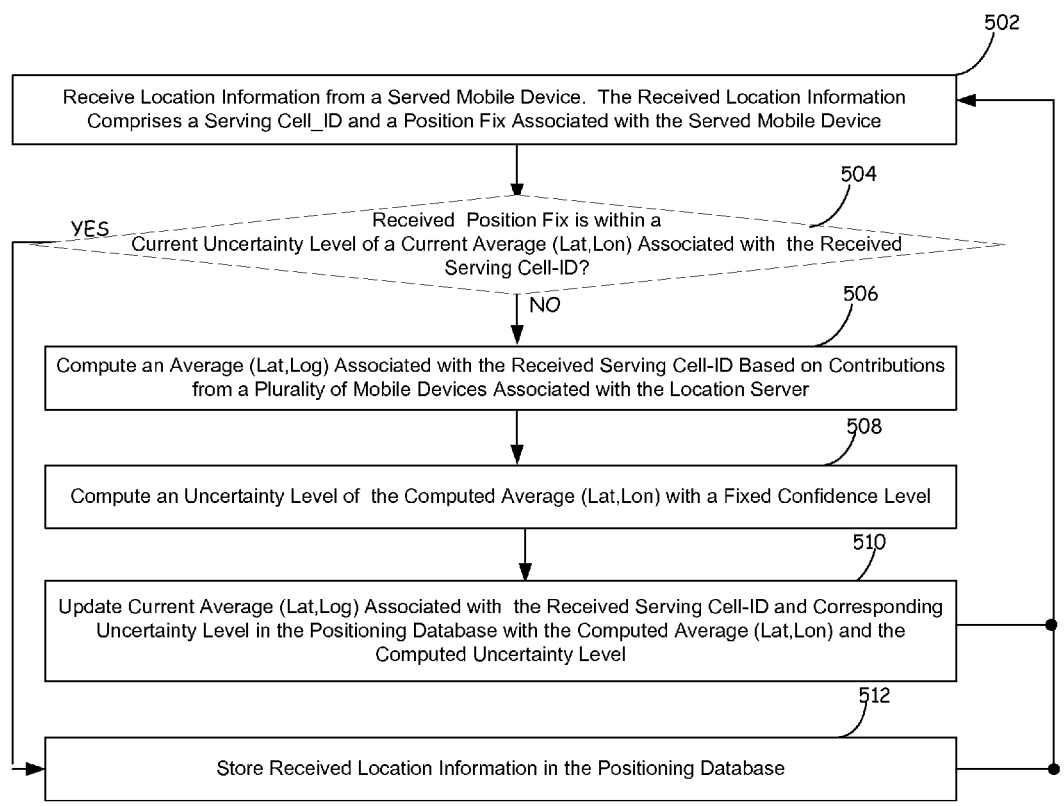
FIG. 5 is a flow chart illustrating exemplary steps for dynamically computing an uncertainty level with a fixed confidence level for a Cell-ID based mobile positioning, in accordance with an embodiment of the invention.

FIG. 5 is a flow chart illustrating exemplary steps for dynamically computing an uncertainty level with a fixed confidence level for a Cell-ID based mobile positioning, in accordance with an embodiment of the invention. Referring to FIG. 5, the exemplary steps start with step 502, where the location server 140 may receive location information from a served mobile device such as, for example, the GNSS enabled cell phone 110c. The received location information comprise a serving Cell-ID for the cell that the GNSS enabled cell phone 110c is attached as well as a GNSS position fix associated with the GNSS enabled cell phone 110c. The GNSS position fix may be calculated based on GNSS signals from the GNSS satellites 170a through 170c.

In step 504, it may be determined whether the received position fix is within a current uncertainty level of a current average of latitude and longitude (Lat, Lon) associated with the received serving Cell-ID in the positioning database 304. In instances where the received position fix is within the current uncertainty level of the current average of the latitude and longitude associated with the received serving Cell-ID in the positioning database 304, then in step 512, the received location information from the GNSS enabled cell phone 110c may be stored in the positioning database 304.

In step 504, in instances where the received position fix is outside the current uncertainty level of the current average of the latitude and longitude associated with the received serving Cell-ID in the positioning database 304, then in step 506, the location server 140 may be enabled to compute an average of the latitude and longitude associated with the received serving Cell-ID based on location information captured or learned from the GNSS enabled cell phone 110c as well as other served mobile devices associated with the location server 140.

In step 508, the location server 140 may be enabled to compute an uncertainty level of the computed average of the latitude and longitude with a fixed confidence level.

In step 510, the current average of the latitude and longitude and current uncertainty level associated with the received serving Cell-ID may be updated with the computed average of the latitude and longitude and the computed uncertainty level, respectively. The exemplary steps return to the step 502.

Figure 6:
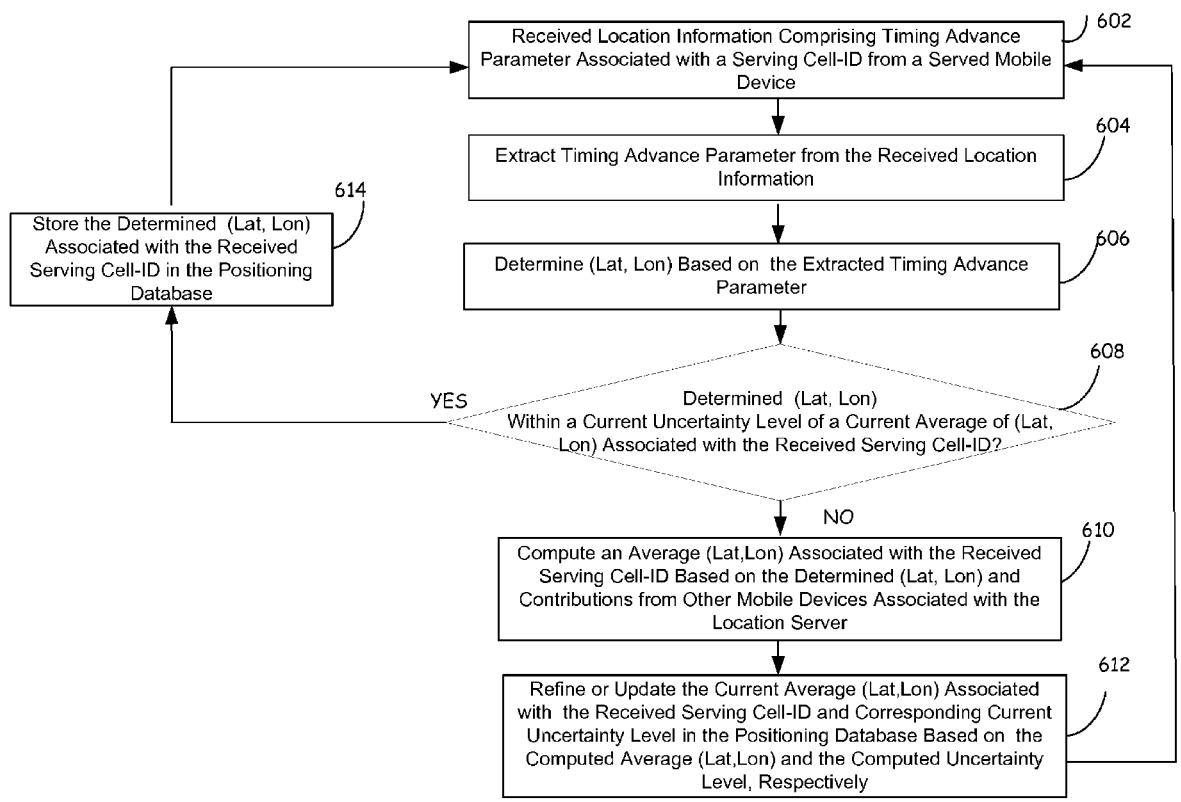
FIG. 6 is a flow chart illustrating exemplary steps for refining uncertainty level with a fixed confidence level for a Cell-ID based positioning based on reported timing advance, in accordance with an embodiment of the invention.

FIG. 6 is a flow chart illustrating exemplary steps for refining uncertainty level with a fixed confidence level for a Cell-ID based positioning based on reported timing advance, in accordance with an embodiment of the invention. Referring to FIG. 6, the exemplary steps start with step 602, where the location server 140 may receive location information from a served mobile device such as the GNSS enabled cell phone 110c within the cell 110. The received location information may comprise timing advance parameter associated with a serving Cell-ID corresponding to the cell 110.

In step 604, the location server 140 may be enabled to extract the timing advance parameter from the received location information. In step 606, the location server 140 may be enabled to determine the latitude and longitude associated with the serving Cell-ID based on the extracted timing advance parameter.

In step 608, it may be determined whether the determined (Lat, Lon) associated with the serving Cell-ID is within a current uncertainty level of a current average of the latitude and longitude associated with the serving Cell-ID in the positioning database 304. In instances where the determined latitude and longitude associated with the serving Cell-ID is within the current uncertainty level of the current average of the latitude and longitude associated with the serving Cell-ID in the positioning database 304, then in step 614, where the location server 140 may be enabled to store the determined latitude and longitude associated with the serving Cell-ID into the positioning database 304. The exemplary process continues in step 602.

In step 608, in instances where the determined (Lat, Lon) associated with the serving Cell-ID is outside of the current uncertainty level of the current average of the latitude and longitude associated with the serving Cell-ID in the positioning database 304, then in step 610, the location server 140 may be enabled to compute an average of the latitude and longitude associated with the serving Cell-ID based on the determined latitude and longitude and contributions from other mobile devices associated with the location server 140.

In step 612, the location server 140 may be operable to refine or update the current average of the latitude and longitude associated with the serving Cell-ID and corresponding current uncertainty level in the positioning database 302 with the computed average of the latitude and longitude and the computed uncertainty level, respectively. The exemplary process continues in step 602.

Figure 7:
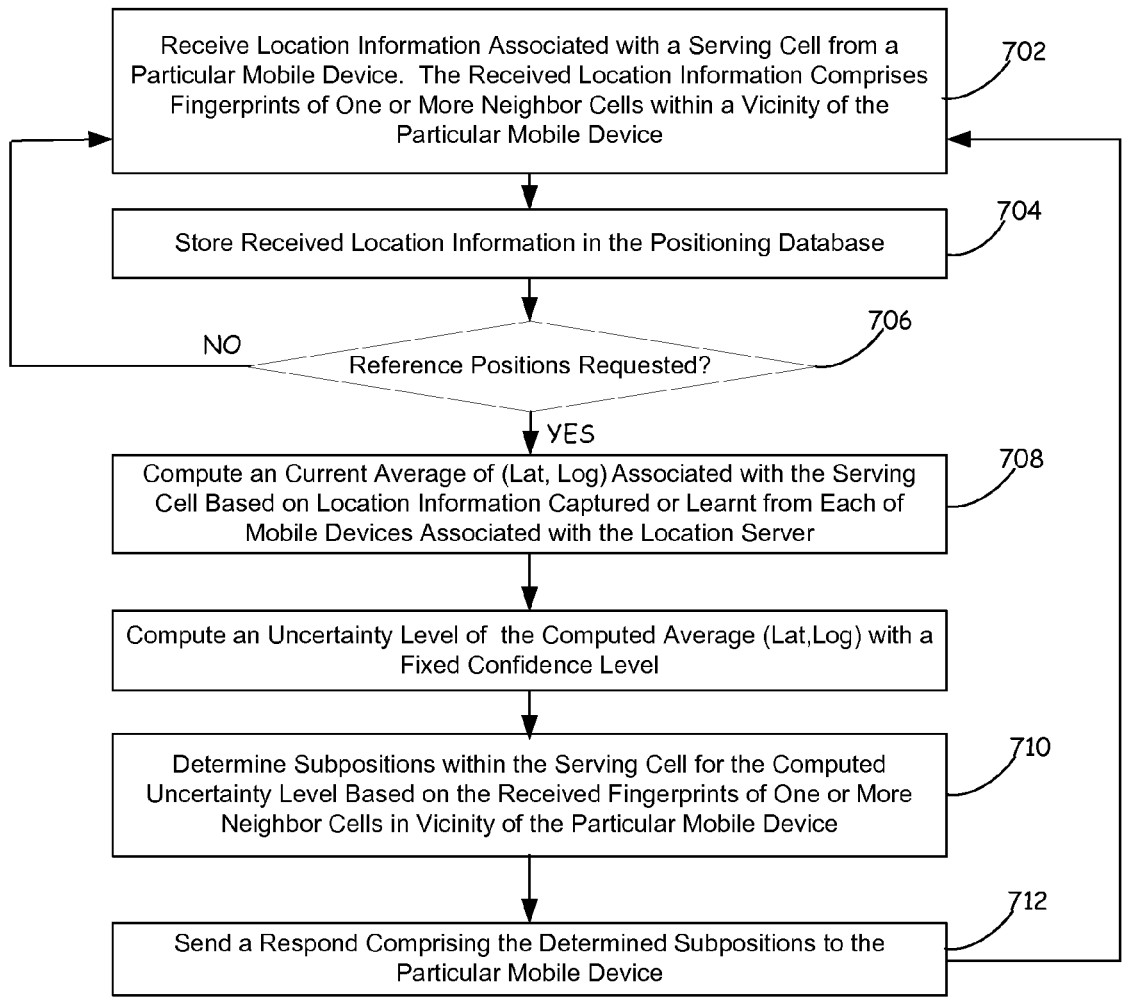
FIG. 7 is a flow chart illustrating exemplary steps for providing Cell-ID based mobile positioning based on reported neighbor cell fingerprinting, in accordance with an embodiment of the invention.

FIG. 7 is a flow chart illustrating exemplary steps for providing Cell-ID based mobile positioning based on reported neighbor cell fingerprinting, in accordance with an embodiment of the invention. Referring to FIG. 7, the exemplary steps start with step 702, where the location server 140 may receive location information from a served mobile device such as the GNSS enabled cell phone 110c within the cell 110. The received location information may comprise fingerprints of one or more neighbor cells such as the cell 120 in vicinity of the GNSS enabled cell phone 110c. The fingerprints of the one or more neighbor cells may comprise signal strength, signal time delay, or even channel impulse response measured for signals from neighbor cells at the GNSS enabled cell phone 110c. In this regard, the fingerprints of the one or more neighbor cells may comprise of signals measured from GSM, UMTS, and/or CDMA 2000. In step 704, the location server 140 may be enabled to store the received location information in the positioning database 302. In step 706, it may be determined whether the GNSS enabled cell phone 110c may request reference positions. In instances where the GNSS enabled cell phone 110c may request reference positions, then in step 708, where the location server 140 may be enabled to compute an average of the latitude and longitude associated with the serving cell based on location information captured or learned from each of served mobile devices associated with the location server 140 for the serving cell. In step 710, the location server 140 may be enabled to compute an uncertainty level of the computed average of the latitude and longitude with a fixed confidence level.

In step 712, based on the received fingerprints of the one or more neighbor cells in vicinity of the GNSS enabled cell phone 110c, the location server 140 may be enabled to determine reference subpositions within the serving cell for the computed uncertainty level. In step 714, the location server 140 may be enabled to send a response comprising the determined reference subpositions to the GNSS enabled cell phone 110c. The exemplary steps continue in step 702. In step 706, in instances where the GNSS enabled cell phone 110c may not request reference positions, then the exemplary process returns to step 702.

Figure 8:
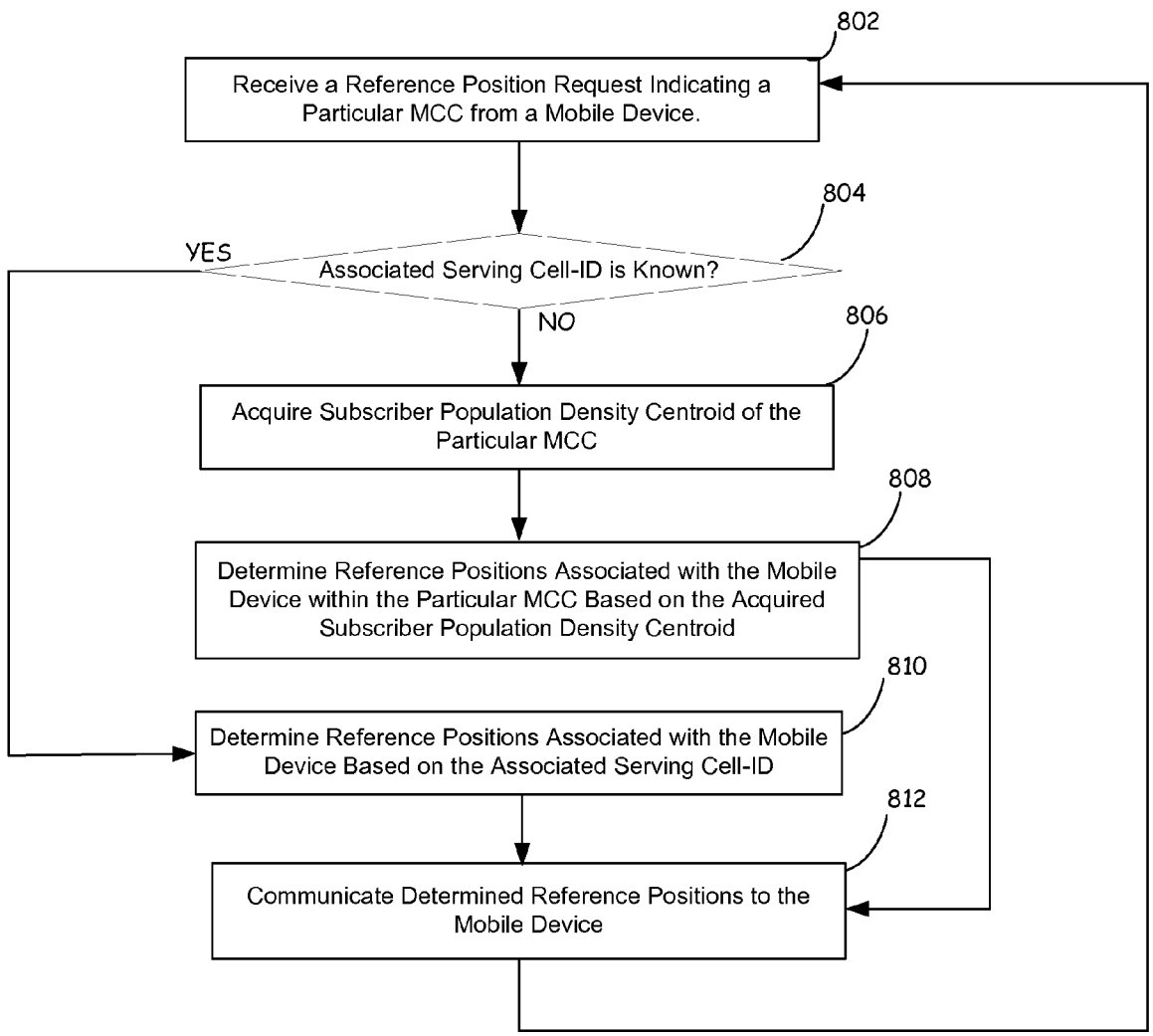
FIG. 8 is a flow chart illustrating exemplary steps for determining a position of a mobile communication device based on combined MCC and subscriber population centroid, in accordance with an embodiment of the invention.

FIG. 8 is a flow chart illustrating exemplary steps for determining a position of a mobile communication device based on combined MCC and subscriber population centroid, in accordance with an embodiment of the invention. Referring to FIG. 8, the exemplary steps start with step 802, where the location server 140 may receive a reference position request from the GNSS enabled cell phone 110c. The received reference position request comprises a particular MCC that the GNSS enabled cell phone 110c is associated with. In step 804, it may be determined whether a serving Cell-ID associated with the GNSS enabled cell phone 110c is known at the location server 140. In instances where the serving Cell-ID associated with the GNSS enabled cell phone 110c is unknown at the location server 140, then in step 806, where the location server 140 may be enabled to acquire subscriber population density centroid of the particular MCC. In step 808, the location server 140 may be enabled to determine reference positions associated with the GNSS enabled cell phone 110c within the particular MCC based on the acquired subscriber population density centroid. In step 812, the location server 140 may communicate the determined reference positions to the GNSS enabled cell phone 110c. In step 804, in instances where the serving Cell-ID associated with the GNSS enabled cell phone 110c is known at the location server 140, then in step 810, where the location server 140 may be enabled to determine and provide reference positions associated with the GNSS enabled cell phone 110c based on various Cell-ID based positioning methods. The exemplary process may continue in step 812.

Aspects of a method and system for determining a position or location of a mobile communication device are provided. In accordance with various exemplary embodiments of the invention, a mobile device such as, for example, the GNSS enabled cell phone 110c, may be enabled to generate GNSS-based location data and non-GNSS based location data and transmit a combination of the generated GNSS-based location data and non-GNSS based location data to the location server 140 for more accurate reference positions. The location server 140 may be enabled to determine reference positions based on the transmitted combination of the generated GNSS-based location data and non-GNSS based location data. The determined reference positions may be communicated to the GNSS enabled cell phone 110c via the wireless communication network 130. The GNSS enabled cell phone 110c may be enabled to receive the determined reference positions from the location server 140 to calculate an associated GNSS position fix. The generated GNSS-based location data may comprise GNSS position fixes associated with the GNSS enabled cell phone 110c. The generated non-GNSS based location data may comprise a serving Cell-ID, one or more neighbor Cell-IDs, neighbor cell fingerprinting, timing advance parameters, and/or a mobile country code. The neighbor cell fingerprint may comprise signal strength, signal time delay, and/or a channel impulse response measured for signals from the one or more neighbor cells at the GNSS enabled cell phone 110c.

The location server 140 may be enabled to acquire and/or learn location information associated with the serving Cell-ID from the GNSS enabled cell phone 110c as well as other served mobile devices associated with the location server 140. The location server 140 may be enabled to determine and/or refine reference positions based on the acquired location information. As described with respect to, for example, FIG. 4 through FIG. 7, the location server 140 may be enabled to determine and/or refine reference positions in various ways such as, for example, by correlating the serving Cell-ID with GNSS position fixes, timing advance parameters, and/or neighbor cell fingerprinting. For example, referring to FIG. 5 and FIG. 6, the location server 140 may be enabled to adaptively compute an uncertainty level with a fixed confidence of the determined and/or refined reference positions. The uncertainty level may be determined based on the acquired location information such as GNSS position fixes and/or timing advance parameters associated with the serving Cell-ID. Referring to FIG. 7, to respond a reference position request from the GNSS enable cell phone 110c without an associated serving Cell-ID, the location server 140 may be configured to identify subscriber population density of an associated mobile country code (MCC) via the wireless communication network 130. The combination of the identified subscriber population density and the associated MCC may be utilized to determine corresponding reference positions associated with the GNSS enable cell phone 110c.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for a method and system for determining a position of a mobile communication device.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method of processing signals, the method comprising:
transmitting a combination of GNSS-based location data and non-GNSS based location data from a GNSS enabled mobile device to a location server, wherein said location server:
   determines a reference position based on said transmitted combination of GNSS-based location data and non-GNSS based location data;
   adaptively computes an uncertainty level with a fixed confidence level based on location information associated with said non-GNSS based location data; and
   refines said determined reference position based on said adaptively computed uncertainty level;
receiving from said location server, said refined determined reference position by said GNSS enabled mobile device; and
calculating a GNSS position fix of said GNSS enabled mobile device based on said refined determined reference position received by said GNSS enabled mobile device.

2. The method according to claim 1, wherein said transmitted GNSS-based location data comprises previously determined GNSS position fixes associated with said GNSS enabled mobile device.

3. The method according to claim 1, wherein said transmitted non-GNSS based location data comprises a serving Cell-ID, one or more neighbor Cell-IDs, neighbor cell fingerprinting, timing advance parameters, and/or a mobile country code.

4. The method according to claim 3, wherein said neighbor cell fingerprinting is associated with said one or more neighbor Cell-IDs.

5. The method according to claim 3, wherein said location server acquires location information associated with said serving Cell-ID from said GNSS enabled mobile device and other mobile devices associated with said location server.

6. The method according to claim 5, wherein said location server adaptively computes said uncertainty level with said fixed confidence level based on said acquired location information associated with said serving Cell-ID.

7. The method according to claim 3, wherein said location server refines said determined reference position based on said timing advance parameters.

8. The method according to claim 7, wherein said location server determines one or more reference subpositions associated with said serving Cell-ID based on said neighbor cell fingerprinting.

9. The method according to claim 8, wherein said location server communicates said determined one or more reference subpositions associated with said serving Cell-ID to said GNSS enabled mobile device.

10. The method according to claim 3, wherein:
when said serving Cell-ID in said transmitted non-GNSS based location data is unknown to said location server, said location server identifies a subscriber population density associated with said mobile country code.

11. A system for processing signals, the system comprising:
one or more processors configured for use in a GNSS enabled mobile device;
said one or more processors are operable to transmit a combination of GNSS-based location data and non-GNSS based location data from said GNSS enabled mobile device to a location server, wherein said location server:
   determines a reference position based on said transmitted combination of GNSS-based location data and non-GNSS based location data;
   adaptively computes an uncertainty level with a fixed confidence level based on location information associated with said non-GNSS based location data; and
   refines said determined reference position based on said adaptively computed uncertainty level;
said one or more processors are operable to receive from said location server, said refined determined reference position; and
said one or more processors are operable to calculate a GNSS position fix of said GNSS enabled mobile device based on said refined determined reference position.

12. The system according to claim 11, wherein said transmitted GNSS-based location data comprises previously determined GNSS position fixes associated with said GNSS enabled mobile device.

13. The system according to claim 11, wherein said transmitted non-GNSS based location data comprises a serving Cell-ID, one or more neighbor Cell-IDs, neighbor cell fingerprinting, timing advance parameters, and/or a mobile country code.

14. The system according to claim 13, wherein said neighbor cell fingerprinting is associated with said one or more neighbor Cell-IDs.

15. The system according to claim 13, wherein said location server acquires location information associated with said serving Cell-ID from said GNSS enabled mobile device and other mobile devices associated with said location server.

16. The system according to claim 15, wherein said location server adaptively computes said uncertainty level with said fixed confidence level based on said acquired location information associated with said serving Cell-ID.

17. The system according to claim 13, wherein said location server refines said determined reference position based on said timing advance parameters.

18. The system according to claim 17, wherein said location server determines one or more reference subpositions associated with said serving Cell-ID based on said neighbor cell fingerprinting.

19. The system according to claim 18, wherein said location server communicates said determined one or more reference subpositions associated with said serving Cell-ID to said GNSS enabled mobile device.

20. The system according to claim 13, wherein:
when said serving Cell-ID in said transmitted non-GNSS based location data is unknown to said location server, said location server identifies a subscriber population density associated with said mobile country code.

21. The system according to claim 20, wherein said location server determines said reference position based on said mobile country code and identified subscriber population density associated with said mobile country code.

22. A system for processing signals, the system comprising:
a GNSS enabled mobile device operable to transmit GNSS-based location data and non-GNSS based location data from said GNSS enabled mobile device to a location server, wherein said location server:

determines a reference position based on said transmitted GNSS-based location data and non-GNSS based location data;

adaptively computes an uncertainty level with a fixed confidence level based on location information associated with a serving Cell-ID in said non-GNSS based location data; and refines said determined reference position based on said adaptively computed uncertainty level and on timing advance parameters in said non-GNSS based location data;

said GNSS enabled mobile device is operable to receive from said location server, said refined determined reference position; and said GNSS enabled mobile device is operable to calculate a GNSS position fix based on said refined determined reference position.

* * * * *